United States Patent
Shoda et al.

(10) Patent No.: US 10,196,043 B2
(45) Date of Patent: Feb. 5, 2019

(54) WIPER SYSTEM CONTROL METHOD AND WIPER SYSTEM CONTROL DEVICE

(71) Applicant: MITSUBA Corporation, Gunma (JP)

(72) Inventors: Hirokazu Shoda, Gunma (JP); Toshiyuki Amagasa, Gunma (JP)

(73) Assignee: MITSUBA CORPORATION, Gunma (JP)

( * ) Notice: Subject to any disclaimer, the term of this patent is extended or adjusted under 35 U.S.C. 154(b) by 2 days.

(21) Appl. No.: 15/127,047

(22) PCT Filed: Mar. 21, 2015

(86) PCT No.: PCT/JP2015/058635
§ 371 (c)(1),
(2) Date: Sep. 19, 2016

(87) PCT Pub. No.: WO2015/146868
PCT Pub. Date: Oct. 1, 2015

(65) Prior Publication Data
US 2017/0113655 A1 Apr. 27, 2017

(30) Foreign Application Priority Data

Mar. 27, 2014 (JP) ................................. 2014-066258

(51) Int. Cl.
*B60S 1/08* (2006.01)

(52) U.S. Cl.
CPC ........... *B60S 1/0818* (2013.01); *B60S 1/0833* (2013.01)

(58) Field of Classification Search
None
See application file for complete search history.

(56) References Cited

U.S. PATENT DOCUMENTS

| | | | | |
|---|---|---|---|---|
| 4,431,954 A | * | 2/1984 | Carpenter | ............. B60S 1/0814 15/250.13 |
| 2002/0078522 A1 | * | 6/2002 | Lee | ........................ B60S 1/34 15/250.19 |

(Continued)

FOREIGN PATENT DOCUMENTS

| DE | 103 60 117 | 6/2005 |
|---|---|---|
| DE | 10 2009 029 098 | 3/2011 |
| EP | 1 069 013 | 1/2001 |
| JP | 2005-206032 | 8/2005 |
| JP | 2009-23451 | 2/2009 |
| WO | 00/71397 | 11/2000 |

OTHER PUBLICATIONS

Machine Translation of JP 2005-206032 to Koji et al. submitted by applicant in the IDS dated Sep. 19, 2016 (Year: 2005).*

(Continued)

*Primary Examiner* — Navid Ziaeianmehdizadeh
(74) *Attorney, Agent, or Firm* — Wenderoth, Lind & Ponack, L.L.P.

(57) ABSTRACT

A wiper system according to the present invention includes wiper blades (2a, 2b) that perform a reciprocating wiping operation on a windshield (3), and a raindrop sensor (9) that detects the current amount of rainfall based on water droplets adhering to the windshield (3). If rainfall more than or equal to a predetermined amount is detected by the raindrop sensor (9), a heavy rain mode in which a wiping range of the wiper blades (2a, 2b) is made narrower than in a normal wiping operation is carried out. In the heavy rain mode, the wiper blade (2a) arranged on the driver's side is activated at high speed (Hi) within a heavy rain time wiping area X set near the forward field of view of the driver to ensure the field of view of the driver.

8 Claims, 6 Drawing Sheets

(56) References Cited

U.S. PATENT DOCUMENTS

| | | | | |
|---|---|---|---|---|
| 2004/0080751 A1* | 4/2004 | Kokuryo | ............... | B60S 1/0818 |
| | | | | 356/445 |
| 2005/0285557 A1* | 12/2005 | Morishita | ............. | B60S 1/0818 |
| | | | | 318/444 |
| 2006/0055354 A1* | 3/2006 | Hirose | .................. | B60S 1/0818 |
| | | | | 318/444 |
| 2007/0132417 A1* | 6/2007 | Kokuryo | ............... | B60S 1/0818 |
| | | | | 318/483 |
| 2008/0030159 A1* | 2/2008 | Hiramoto | ............. | B60S 1/0818 |
| | | | | 318/483 |
| 2009/0089955 A1* | 4/2009 | Ohata | ....................... | B60S 1/08 |
| | | | | 15/250.12 |
| 2012/0062163 A1* | 3/2012 | Morishita | ............. | B60S 1/0833 |
| | | | | 318/483 |
| 2012/0216830 A1 | 8/2012 | Zimmer | | |

OTHER PUBLICATIONS

International Search Report dated Jun. 9, 2015 in International (PCT) Application No. PCT/JP2015/058635.
Extended European Search Report dated Nov. 3, 2017 in European Application No. 15769473.8.
International Preliminary Report on Patentability and Written Opinion of the International Searching Authority dated Oct. 6, 2016 in corresponding International (PCT) Application No. PCT/JP2015/058635.

* cited by examiner

WIPER SYSTEM CONTROL METHOD AND WIPER SYSTEM CONTROL DEVICE

TECHNICAL FIELD

The present invention relates to a control method and a control device for a wiper system mounted on a vehicle such as an automobile, and more particularly to a technique effectively applicable to a wiper system that includes a raindrop sensor (rain sensor) for detecting the amount of rainfall.

BACKGROUND ART

From the field of viewpoint of safety and convenience, vehicles on which an automatic wiper system for detecting the amount of rainfall and automatically controlling an operation of a wiper device is mounted have been on the increase in recent years. Such a wiper system controls the wiper operation according to the amount of rain. As the amount of rainfall increases, the wiper speed is appropriately switched from INT (intermittent activation state) to Lo (low speed activation state: normal activation state) to Hi (high speed activation state) (or continuously in some models of vehicles). However, in the event of a heavy rainfall such as a sudden localized heavy rain, squall, and rain gust, even a system including a raindrop sensor may have difficulty in securing the field of view, since a large amount of rain adheres to the windshield immediately after a wiping operation with the wiper operation switched to the Hi activation. In particular, in a "torrential rain" with more than 50 mm of one-hour rainfall, it has often been the case that the forward field of view is not available and driving operation becomes difficult even in an attempt to pull off the vehicle to an appropriate place for safety.

A configuration such as described in Patent Document 1 has been heretofore proposed as means for coping with a large amount of rainfall like a localized heavy rain. According to Patent Document 1, two types of wipers including a reciprocating swing wiper and a rotary wiper are used as wiper devices. If the amount of rain exceeds the limit of the wiping capability of the reciprocating swing wiper, the reciprocating swing wiper is stopped and the rotary wiper is activated. In such a manner, a torrent of rain is removed from the windshield to increase the transparency and ensure the field of view of the driver even during a heavy rain.

CITATION LIST

Patent Document

Patent Document 1: International Publication. No. WO 00/71397

DISCLOSURE OF THE INVENTION

Problems to be Solved by the Invention

However, in the case of Patent Document 1, the presence of the two types of wiper devices on the windshield makes the system configuration extremely complicated. This also increases the device weight and inevitably increases the system cost. In addition, rotary wipers like those of construction vehicles and locomotives are far from being suitable for passenger cars both in design and in feel, even as emergency means.

Means for Solving the Problems

A wiper system control method according to the present invention is a method for controlling a wiper system including a wiper blade that performs a reciprocating wiping operation on a wiping surface, and a raindrop sensor that detects a current amount of rainfall based on water droplets adhering to the wiping surface, wherein when rainfall more than or equal to a predetermined amount is detected by the raindrop sensor, a wiping range of the wiper blade is made narrower than in a normal wiping operation.

According to the present invention, when rainfall more than or equal to the predetermined amount is detected, the wiper blade makes a wiping operation within a range narrower than normal. This reduces the time needed for one wiping operation, and the range is frequently wiped out even during a heavy rain. As a result, even in a heavy rain such that a large amount of rain adheres to the windshield immediately after a wiping operation, raindrops are quickly wiped off to ensure a field of view needed for driving operation.

The wiper system may have a low speed activation state (Lo) in which the wiper blade is activated at low speed, and a high speed activation state (Hi) in which the wiper blade is activated at speed higher than in the low speed activation state. In the wiper system control method, when rainfall more than or equal to the predetermined amount is detected by the raindrop sensor, the wiper blade arranged on a driver's side may be activated in the high speed activation state (Hi) within a heavy rain time wiping area narrower than a normal wiping operation range set near a forward field of view of the driver.

A wiper system control device according to the present invention is a control device for performing an operation control of a wiper system including a wiper blade that performs a reciprocating wiping operation on a wiping surface, and a raindrop sensor that detects a current amount of rainfall based on water droplets adhering to the wiping surface, the wiper system control device including a rainfall state determination unit that determines a current state of rainfall based on an output signal of the raindrop sensor, and an operation mode changing unit that, when the rainfall state determination unit determines that the amount of rainfall is more than or equal to a predetermined value and it is in a heavy rain state, changes an operation pattern of the wiper blade to a heavy rain mode in which a wiping range of the wiper blade is made narrower than in a normal wiping operation.

According to the present invention, when the rainfall state determination unit determines that the amount of rainfall is more than or equal to the predetermined value and it is in the heavy rain state, the operation mode changing unit changes the operation pattern of the wiper blade to the heavy rain mode to make the wiping range narrower than in the normal wiping operation. This reduces the time needed for one wiping operation of the wiper blade, and the range is frequently wiped out even during a heavy rain. As a result, even in a heavy rain such that a large amount of rain adheres to the windshield immediately after a wiping operation, raindrops are quickly wiped off to ensure the field of view needed for driving operation.

The wiper system may have a low speed activation state (Lo) in which the wiper blade is activated at low speed, and a high speed activation state (Hi) in which the wiper blade is activated at speed higher than in the low speed activation state. In the wiper system control device, the operation mode changing unit, in the case of the heavy rain mode, may activate the wiper blade arranged on a driver's side in the high speed activation state (Hi) within a heavy rain time wiping area narrower than a normal wiping operation range set near a forward field of view of the driver.

Advantages of the Invention

According to the wiper system control method of the present invention, in the wiper system including the raindrop sensor, when rainfall more than or equal to the predetermined amount is detected by the raindrop sensor, the wiping range of the wiper blade is made narrower than in the normal wiping operation. The predetermined wiping range is therefore frequently wiped out even during a heavy rain, and the field of view needed for driving operation can be ensured. Even in the case of a localized heavy rain and the like, the field of view can thus be ensured until the vehicle is pulled off to a safe place. In addition, the present invention can be applied to a conventional wiper system by improving control software, without changing a device configuration. The field of view during a heavy rain can thus be ensured without complication of the system structure or an increase in cost.

According to the wiper system control device of the present invention, in the wiper system including the raindrop sensor, when the rainfall state determination unit detects rainfall more than or equal to the predetermined amount, the operation mode changing unit changes the operation pattern of the wiper blade to the heavy rain mode to make the wiping range narrower than in the normal wiping operation. The predetermined wiping range is therefore frequently wiped out even during a heavy rain, and the field of view needed for driving operation can be ensured. Even in the case of a localized heavy rain and the like, the field of view can thus be ensured until the vehicle is pulled off to a safe place. In addition, the present invention can be applied to a conventional wiper system by improving control software, without changing a device configuration. The field of view during a heavy rain can thus be ensured without complication of the system structure or an increase in cost.

BEST MODE FOR CARRYING OUT THE INVENTION

Figure 1:
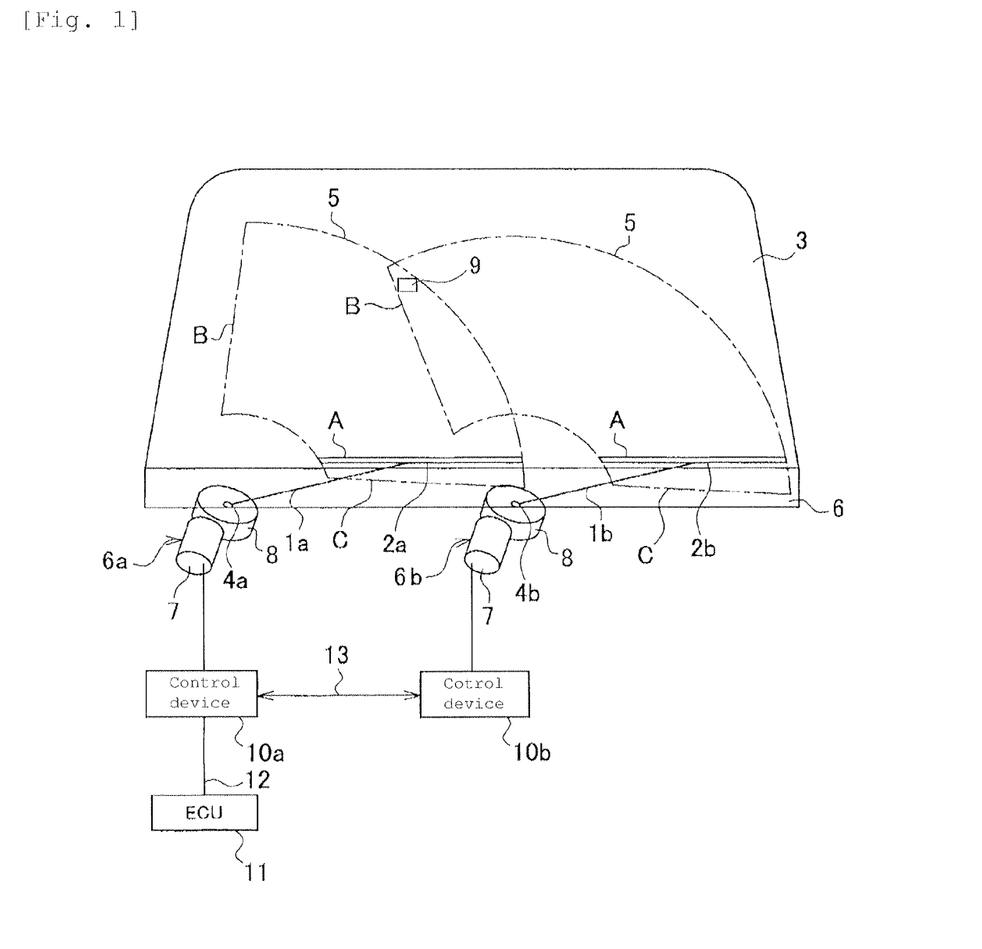
FIG. 1 is an explanatory diagram illustrating an overall configuration of a wiper system driven by a wiper control method and control device which are an embodiment of the present invention.

An embodiment of the present invention will be described in detail below with reference to the drawings. An object of the present embodiment is to provide a wiper system which can ensure a minimum field of view for a driver at the time of a large amount of rainfall such as a localized heavy rain without complication of the system structure or an increase in cost. FIG. 1 is an explanatory diagram illustrating an overall configuration of a wiper system driven by a wiper control method and control device that are an embodiment of the present invention. The wiper system of FIG. 1 includes a wiper arm 1a on a driver's seat side and a wiper arm 1b on a passenger's seat side. The wiper arms 1a and 1b are swingably arranged on a vehicle body. The wiper system of FIG. 1 includes a so-called automatic wiper system. When a wiper switch is set to Auto (automatic wiper mode), an operation of the wiper system is automatically controlled according to the amount of rain.

A wiper blade 2a on the driver's seat side and a wiper blade 2b on the passenger's seat side are attached to the respective wiper arms 1a and 1b. The wiper blades 2a and 2b (hereinafter, abbreviated as blades 2a and 2b) are brought into elastic contact with a windshield (wiping surface) 3 by not-illustrated spring members or the like provided inside the wiper arms 1a and 1b. Two wiper shafts (pivot shafts) 4a and 4b are arranged on the vehicle body. The wiper arms 1a and 1b are attached at their base end sections to the wiper shafts 4a and 4b, respectively. Note that "a, b" accompanying the reference signs indicate that those members or portions relate to the driver's seat side and the passenger's seat side, respectively.

To cause the wiper arms 1a and 1b to make a swing motion, the system includes two electric motors 6a and 6b (hereinafter, abbreviated as motors 6a and 6b) which are PEN duty-controlled. The motors 6a and 6b include a motor main body 7 and a reduction mechanism 8. The motors 6a and 6b are driven and controlled to rotate forward and backward by wiper control devices 10. The wiper control device 10a which drives and controls the motor 6a is connected to an ECU 11, which is a vehicle-side controller, via a vehicle-mounted LAN 12. The ECU 11 inputs rainfall amount information from a raindrop sensor 9, switch information indicating the state of the wiper switch (Auto, ON/OFF, Lo, Hi, or INT), engine start information, and the like to the wiper control device 10a via the LAN 12. The wiper control devices 10a and 10b are connected with each other by a communication line 13.

The raindrop sensor 9 for detecting the amount of rain is attached to a center portion of the windshield 3. The raindrop sensor 9 includes a light emitting element such as an LED, and a light receiving element such as a photodiode. Infrared rays emitted from the light emitting element are reflected from the surface of the windshield and incident on the light receiving element. If there are raindrops on the windshield 3, the rays from the light emitting element are not reflected by the windshield but passed through the raindrops or scattered by the raindrops. As a result, the amount of light received by the light receiving element in the presence of raindrops decreases as compared to in the absence of raindrops. As the amount of water droplets on the windshield 3 increases, the amount of received light therefore decreases according to the amount, and the output of the raindrop sensor 9 changes. An output signal of the raindrop sensor 9 is input to the ECU 11. The ECU 11 transmits the signal to the wiper control devices 10. The wiper control devices 10 determine the current state of rainfall from a change in the output of the raindrop sensor 9, and automatically controls the activation/stop and the operation (Lo, Hi, or INT) of the wipers.

In the wiper system of FIG. 1, feedback control (PI control) is performed on the motors 6a and 6b based on position information about the blades 2a and 2b. In such a system, the target speeds of both the blades are set to correspond to the positions of the blades 2a and 2b. The target speeds are stored in advance in the wiper control devices 10a and 10b in the form of a map or the like. For the automatic wiper mode, a relationship between the amount of rainfall and the blade target speed is also stored in advance in the form of a map or the like. The wiper control devices 10a and 10b detect the current positions of the blades 2a and 2b, and detect the moving speeds of the blades 2a and 2b from the rotation speeds of the wiper shafts 4a and 4b. The wiper control devices 10a and 10b compare the current speeds of the blades 2a and 2b with the target speeds of the blades 2a and 2b in the current positions. The wiper control devices 10a and 10b then appropriately control the motors 6a and 6b according to differences between the target speeds and the current speeds (in the case of the automatic wiper mode, the amount of rain is also taken into consideration).

Figure 2:
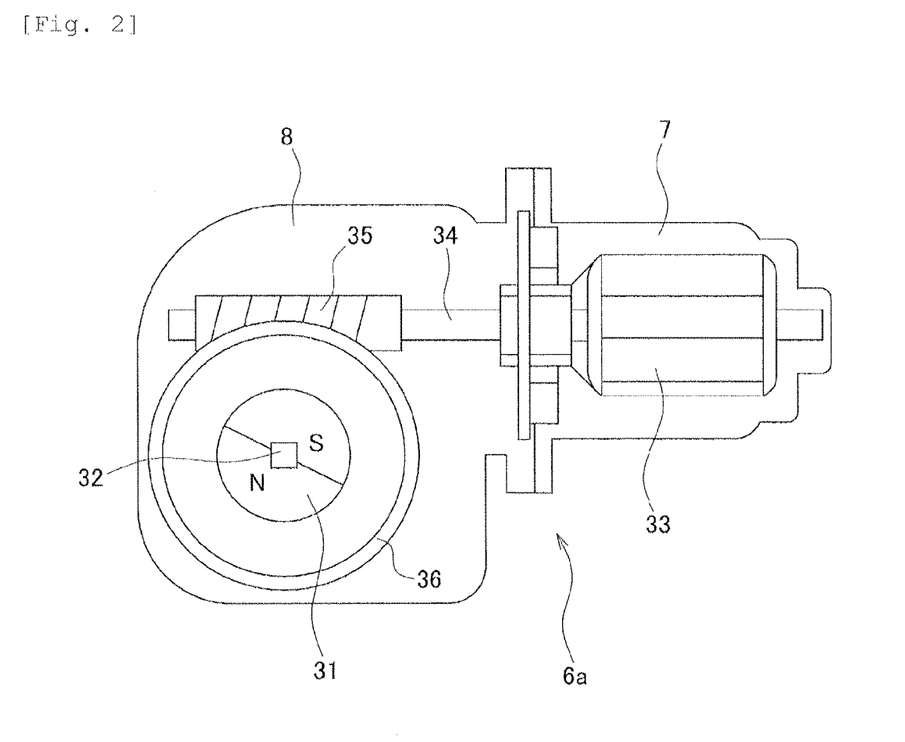
FIG. 2 is an explanatory diagram illustrating a configuration of a motor used in the wiper system of FIG. 1.

To perform the foregoing feedback control, the motors 6a and 6b include a sensor magnet 31 and a rotary encoder IC 32. FIG. 2 is an explanatory diagram illustrating a configuration of the motor 6a. The motor 6b has a similar configuration. As described previously, the motor 6a includes the motor main body 7 and the reduction mechanism 8. A rotor 33 is rotatably arranged in the motor main body 7. A worm 35 is formed on a rotating shaft 34 of the rotor 33. The worm 35 meshes with a worm wheel 36 arranged in the reduction mechanism 8. The wiper shaft 4a is attached to the worm wheel 36. The sensor magnet 31 is further attached to the wiper shaft 4a or the worm wheel 36. A not-illustrated control board is arranged on the reduction mechanism 8 side of the motor 6a. The sensor magnet 31 is opposed to the rotary encoder IC 32 which is attached to the control board.

The rotary encoder IC 32 is an IC haring both the functions of an MR sensor and a Hall IC sensor. The wiper control device 10a detects both pulses and an angle by the sensor magnet 31 and the rotary encoder IC 32, and controls the motor 6a. More specifically, the number of rotations of the wiper shaft 4a is detected from pulses occurring with the rotation of the wiper shaft 4a. The rotation angle of the wiper shaft 4a is detected from a change in an output voltage according to a change in the magnetism of the sensor magnet 31. The number of rotations of the wiper shaft 4a is detected to calculate the rotation speed of the wiper shaft 4a, whereby the speed of the blade 2a is detected. The output voltage value of the rotary encoder IC 32 and the rotation angle of the wiper shaft 4a have a predetermined relationship therebetween, and the current position of the blade 2a is detected based on the voltage value.

Control information such as the speeds and current positions of the blades 2a and 2b are exchanged between the wiper control devices 10a and 10b via the communication line 13. The wiper control devices 10a and 10b synchronously control the motors 6a and 6b based on a positional relationship between the two blades. More specifically, the wiper control devices 10a and 10b initially control the motors 6a and 6b to rotate forward or backward based on the blade position on their own side. The wiper control devices 10a and 10b also control the motors 6a and 6b based on blade position information about the two blades 2a and 2b to control the wiper system so that the blades do not interfere with each other or an angular difference does not increase. As a result, the blades 2a and 2b make a swing motion between a lower reversing position A and an upper reversing position B in their wiping areas 5, and rain, snow, and the like adhering to the windshield 3 are wiped off.

In the wiping system of FIG. 1, retracted positions C are provided under the lower reversing positions A. The blades 2a and 2b are retained in the retracted positions C when the system is in an OFF state (when the wiper switch is OFF, or when entering a wiper stop state in the automatic wiper mode). If the system enters an ON state (when the wiper switch is ON, or when entering a wiper activation state in the automatic wiper mode), the blades 2a and 2b start operation at the retracted positions C and make a reciprocating wiping operation between the lower reversing positions A and the upper reversing positions B. If the system enters an OFF state during the wiping operation, the blades 2a and 2b finish a returning wiping operation, and then pass the lower reversing positions A, move to the retracted positions C, and come to a halt.

Figure 3:
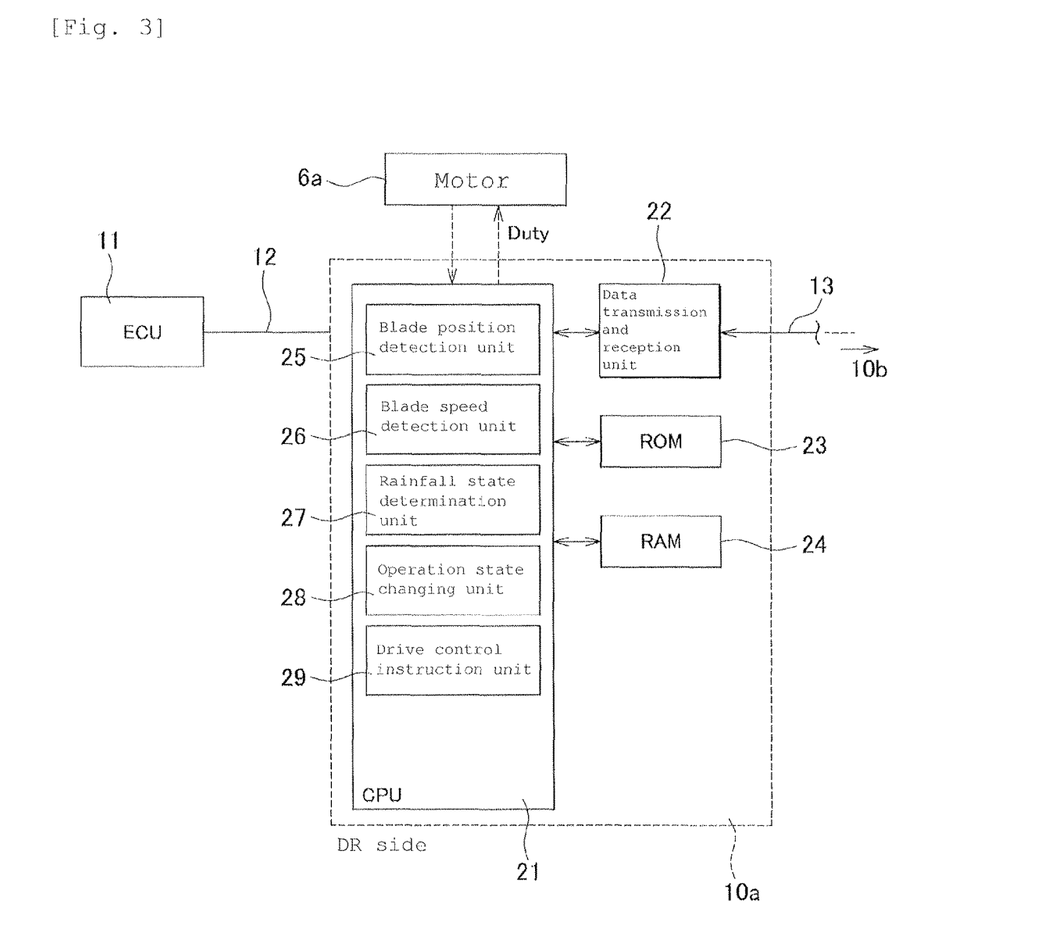
FIG. 3 is a block diagram illustrating a configuration of a control system of the wiper control device according to the present invention.

FIG. 3 is a block diagram illustrating a configuration of a control system of the wiper control devices 10 according to the present invention. Since the wiper control devices 10a and 10b have the same configuration, only the wiper control device 10a will be described in FIG. 3 and in the following description. As illustrated in FIG. 3, the wiper control device 10a includes a CPU 21 and a data transmission and reception unit 22. The wiper control device 10a is connected to the ECU 11 via the LAN 12. Various types of vehicle information including a setting state (operation mode setting such as Auto, ON/OFF, Lo, Hi, and INT) of the wiper switch and the engine start signal are input from the ECU 11 to the wiper control device 10a. The wiper control device 10a further includes a ROM 23 and a RAM 24. The ROM 23 stores a control program and various types of control information. The RAM 24 stores control data such as the number of rotations of the motor and the current position of the blade.

The CPU 21 is a central processing unit. In this system, the CPU 21 connected with the ECU 11 serves as a master. The CPU of the not-illustrated wiper control device 10b serves as a slave. The CPU 21 of the wiper control device 10a is connected to the CPU of the wiper control device 10b via the data transmission and reception unit 22 and the communication line 13. The two CPUs exchange the blade position information and motor operation instructions with each other through the communication line 13. The master-side CPU 21 controls the operation of the motor 6a according to the state of the wiper switch, based on the position information about the blade 2b, transmitted from the wiper control device 10b, and its own position information (about the blade 2a). The slave-side CPU controls the operation of the motor 6b according to instructions from the wiper control device 10a, based on the position information about the blade 2a, transmitted from the wiper control device 10a, and its own position information (about the blade 2b).

The CPU 21 includes a blade position detection unit 25 and a blade speed detection unit 26. The blade position detection unit 25 detects the current position of the blade 2a based on a sensor signal from the rotary encoder IC 32. The blade speed detection unit 26 detects the current moving speed of the blade 2a. The CPU 21 also includes a rainfall state determination unit 27 and an operation mode changing unit 28. The rainfall state determination unit 27 determines the current state of rainfall from the output signal of the raindrop sensor 9. If the rainfall state determination unit 27 determines that the amount of rainfall is large and it is currently in a "heavy rain state," the operation mode changing unit 28 changes the subsequent operation pattern of the blade 2a. The CPU 21 further includes a drive control instruction unit 29. The drive control instruction unit 29 instructs the motor 6*a* about the direction of rotation, duty, and the like so that the blade 2*a* is appropriately operated in the wiping area 5. If it is determined to be in the heavy rain state, the drive control instruction unit 29 switches the wiper operation to a "heavy rain mode" so that the blade 2*a* makes a Hi operation within a limited narrow wiping area to ensure the forward field of view of the driver.

Figure 4:
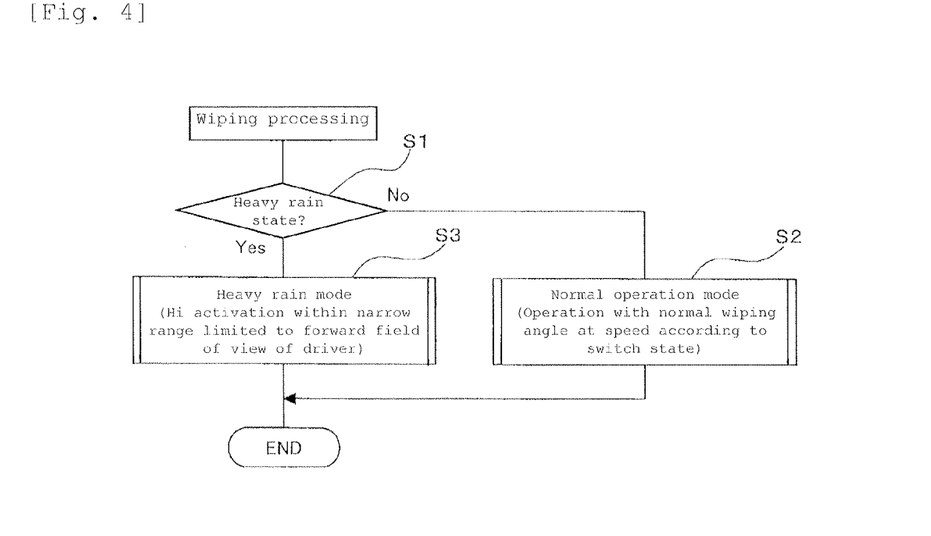
FIG. 4 is a flowchart illustrating a procedure of control processing according to the present invention.

To cope with the heavy rain state, the wiper system according to the present invention performs the following control processing. FIG. 4 is a flowchart illustrating a procedure of the control processing according to the present invention. The processing of FIG. 4 is executed by the wiper control devices 10*a* and 10*b*. In the control processing of FIG. 4, the current state of rainfall is initially determined (step S1). More specifically, the rainfall state determination unit 27 determines from the output signal of the raindrop sensor 9 whether the current state of rainfall is the "heavy rain state." For example, when the rainfall is determined to exceed 50 mm n one-hour rainfall, the rainfall state determination unit 27 determines that the current state of rainfall is the "heavy rain state." When the state of rainfall is determined to not be a heavy rain, the processing proceeds to step S2. In step S2, a normal wiping operation according to the switch state (Auto, Lo, Hi, or INT) is performed (normal operation mode), and the processing exits the routine.

Figure 5:
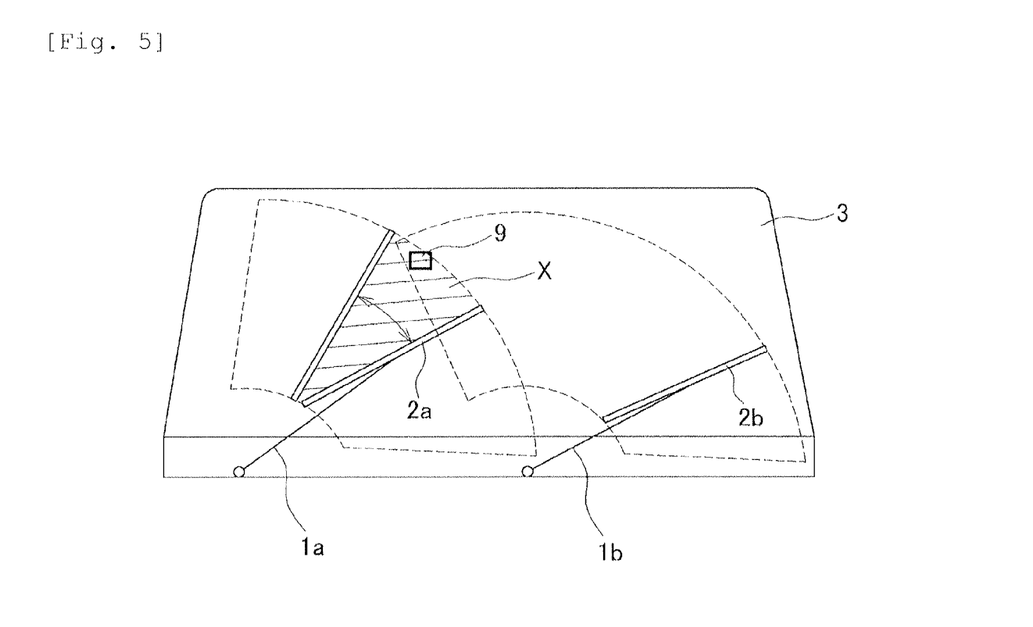
FIG. 5 is an explanatory diagram illustrating a blade operation, in a "heavy rain mode."

On the other hand, it, in step S1, the current state of rainfall is determined to be the "heavy rain state," the processing proceeds to step S3 to execute the "heavy rain mode." FIG. 5 is an explanatory diagram illustrating a blade operation in the "heavy rain mode." As illustrated in FIG. 5, when the operation mode is switched from the normal operation mode to the "heavy rain mode," the blade 2*a* makes a wiping operation only within a wiping area X having a limited narrow wiping angle θ (for example, 30°≤θ≤45°). The heavy rain time wiping area Xi s set near the forward field of view of the driver. The blade 2*a* wipes the range of the area X by the Hi operation (high speed activation state). That is, the operation range of the blade 2*a* is narrowed, and The blade 2*a* is activated for the Hi operation even if the current setting is a Lo operation (low speed activation state) or INT (intermittent activation state). The blade 2*b* is activated over the same wiping area as usual, but is synchronized to not interfere with the blade 2*a*.

Narrowing the wiping range of the blade 2*a* reduces the time needed for one wiping operation, and the range is frequently wiped out even during a heavy rain. As a result, even in a heavy rain such that a large amount of rain adheres to the windshield immediately after a wiping operation, raindrops are quickly wiped off to ensure a minimum field of view needed for driving operation. The field of view can thus be reliably maintained until the vehicle is pulled off to a safe place, and safe driving operation becomes possible even at the time of a sudden localized heavy rain and the like.

The wiper system according to the present invention can ensure the field of view during a heavy rain by using only the wiper devices of reciprocating swing type, without arranging wiper devices of two different structures. In addition, the present invention can be applied to a conventional wiper system by only improving control software, without changing a device (hardware) configuration. The field of view during a heavy rain can thus be ensured without complicating the system structure, and the safety of the vehicle can be improved while suppressing an increase in cost.

The present invention is not limited to the foregoing embodiment, and it will be understood that various modifications may be made without departing from the gist thereof.

For example, the foregoing embodiment describes a control pattern in which the system is activated in the "heavy rain mode" when the heavy rain state is detected in the automatic wiper mode. However, the activation state in the heavy rain mode may be selected by the user's intention. More specifically, for example, "Heavy rain" (heavy rain mode) may be added to the wiper switch so that if the driver sets the wiper switch to "Heavy rain," the heavy rain mode (the wiper blade on the driver's seat side makes the Hi operation in a limited narrow range) is executed.

In the foregoing embodiment, in the "heavy rain mode," the blade 2*b* on the passenger's seat side is activated for a normal Hi operation. However, the blade 2*b* on the passenger's seat side may be stopped in the heavy rain mode. The wiper system of FIG. 1 has demonstrated an example where the present invention is applied to the wiper devices of parallel wiping type in which the wiper blades are activated in the same direction. The present invention is also applicable to wiper devices of opposite wiping type in which the wiper blades are activated in opposite directions.

The electric motors used in the wiper system according to the present invention are not limited to the motor of FIG. 2. For example, a pulse type motor illustrated in FIG. 6 may be used. An electric motor unit 41 of FIG. 6 includes a motor 42 and a gear box 43. The rotation of a rotating shaft 44 of the motor 42 is decelerated in the gear box 43, and output to an output shaft 45. The rotating shaft 44 is rotatably supported by a yoke 46 of closed-bottomed cylindrical shape. A coil-wound armature core 47 around which a coil is wound and a commutator 48 are attached to the rotating shaft 44. A plurality of permanent magnets 49 is fixed to an inner surface of the yoke 46. Power supply brushes 50 are put in sliding contact with the commutator 48. The speed (number of rotations) of the motor 42 is controlled by the amount of current supplied to the brushes 50.

Figure 6:
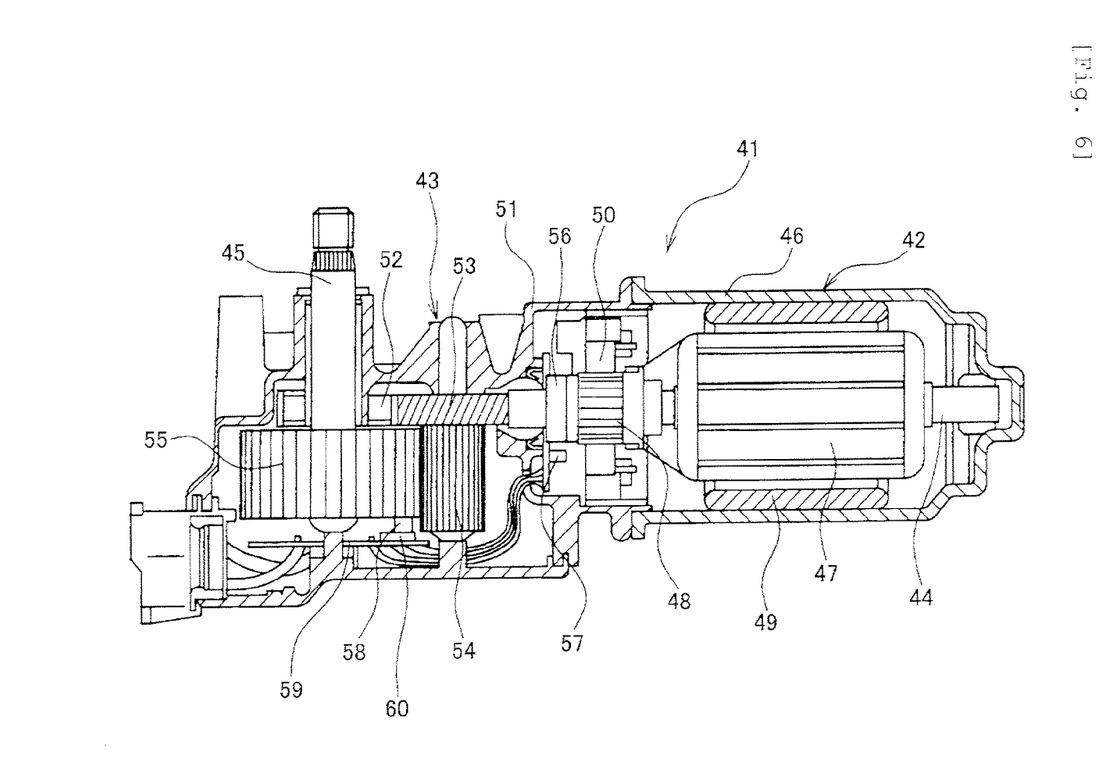
FIG. 6 is an explanatory diagram illustrating a configuration of another motor (motor unit) used in the wiper system of FIG. 1.

A case frame 51 of the gear box 43 is attached to an end rim of the yoke 46 on the opening side. The end of the rotating shaft 44 is protruded from the yoke 46 and accommodated in the case frame 51. A worm 52 is formed on the end of the rotating shaft 44. The worm 52 meshes with a worm gear 53. The worm gear 53 is rotatably supported by the case frame 51. A first gear 54 having a small diameter is coaxially and integrally arranged on the worm gear 53. The first gear 54 meshes with a second gear 55 having a large diameter. The output shaft 45 rotatably supported by the case frame 51 is integrally attached to the second gear 55. Although not illustrated in the diagram, another worm twisting in a reverse direction is formed on the rotating shaft 4, next to the worm 52. The rotation of this worm is transmitted to the second gear 55 by not-illustrated reduction members similar to the work gear 53 and the first gear 54.

The driving force of the motor 42 is output to the output shaft 45 as decelerated through the worm 52, the worm gear 53, the first gear 54, and the second gear 55. A link mechanism (not illustrated) of the wiper device, such as a crank arm, is connected to the output shaft 45. When the motor 42 is activated, a link member is driven via the output shaft 45, and the wiper arm is activated in conjunction with other link members.

Figure 7:
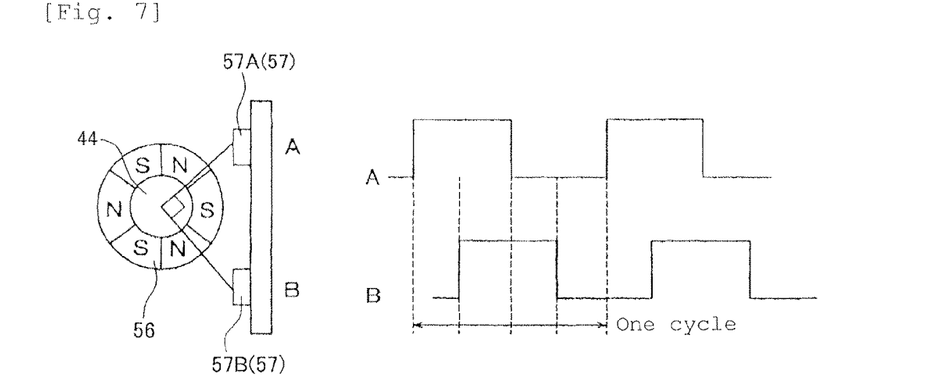
FIG. 7 is an explanatory diagram illustrating a relationship between a magnet and Hall ICs in the motor unit of FIG. 6 and output signals (motor pulses) of the Hall ICs.

A multipole magnet 56 (hereinafter, abbreviated as magnet 56) is attached to the rotating shaft 44. Hall ICs 57 (second sensor) are arranged in the case frame 51 to be opposed to an outer periphery of the magnet 56. FIG. 7 is an explanatory diagram illustrating the relationship between the magnet 56 and the Hall ICs 57 and output signals (motor pulses) of the Hall ICs 57.

As illustrated in FIG. 7, two Hall ICs 57 (57A and 57B) are arranged in positions at an angular difference of 90° about the rotating shaft 44. In the case of the motor 42, the magnet 56 is magnetized into six poles. As the rotating shaft 44 makes one rotation, six cycles of pulse output are obtained from each Hall IC 37. As illustrated on the right side of FIG. 7, the Hail ICs 57A and 57B output pulse signals having a phase difference of ¼ the cycle. Therefore, the timing of occurrence of the pulses from the Hall ICs 57A and 57B can be detected to determine the direction of rotation of the rotating shaft 44 and determine whether the wiper operation is on a forward path or a return path.

The rotation speed of the rotating shaft 44 can be detected from the period of the pulse output of either one of the Hall ICs 57A and 57B. There is a correlation between the number of rotations of the rotating shaft 44 and the speed of the blade, based on the reduction ratio and the link operation ratio. The speed of the blade therefore can also be calculated from the number of rotations of the rotating shaft 44.

A ring magnet 58 for detecting the absolute position of the blade is attached to the bottom surface of the second gear 55. A printed circuit board 59 is attached to the case frame 51. A Hall IC 60 (first sensor) is arranged on the printed circuit board 59 to be opposed to the ring magnet 58. The crank arm is attached to the second gear 55 as described above, and the second gear 55 rotates by approximately 180° to make the blade reciprocate. When the second gear 55 rotates and the blade comes to a reference position set in advance, the Hall IC 60 and the ring magnet 58 are opposed to each other, and a reference signal indicating the absolute position is output.

REFERENCE SIGNS LIST

1a, 1b: Wiper arm
2a, 2b: Wiper blade
3: Windshield
4a, 4b: Wiper shaft
5: Wiping range
6a, 6b: Electric motor
7: Motor main body
8: Reduction mechanism
9: Raindrop sensor
10: Wiper control, device
10a, 10b: Wiper control device
11: ECU
12: Vehicle-mounted LAN
13: Communication line
21: CPU
22: Data transmission and reception unit
23: ROM
24: RAM
25: Blade position detection unit
26: Blade speed detection unit
27: Rainfall state determination unit
28: Operation mode changing unit
29: Drive control instruction unit
31: Sensor magnet
32: Rotary encoder IC
33: Rotor
34: Rotating shaft
35: Worm
36: Worm wheel
41: Electric motor unit
42: Motor
43: Gear box
44: Rotating shaft
45: Output shaft
46: Yoke
47: Armature core
48: Commutator
49: Permanent magnet
50: Brush
51: Case frame
52: Worm
53: Worm gear
54: First gear
55: Second gear
56: Multipole magnet
57: Hall IC
57A, 57B: Hall IC
58: Ring magnet
59: Printed circuit board
60: Hall IC
A: Lower reversing position
B: Upper reversing position
C: Retract position
X: Heavy rain time wiping area
θ: Heavy rain time wiping area angle

The invention claimed is:

1. A wiper system control method for controlling a wiper system for a vehicle including a wiper blade that performs a reciprocating wiping operation on a wiping surface, and a raindrop sensor that detects a current amount of rainfall based on water droplets adhering to the wiping surface, wherein the wiper blade includes a driver's seat side wiper blade arranged on a driver's seat side of the vehicle and a passenger's seat side wiper blade arranged on a passenger's seat side of the vehicle, the wiper system control method comprising:

driving the driver's seat side wiper blade by a first electric motor;

driving the passenger's seat side wiper blade by a second electric motor separately provided from the first electric motor, the first electric motor being driven and controlled by a first wiper control device and the second electric motor being driven and controlled by a second wiper control device connected to the first wiper control device by a communication line;

synchronously controlling the first electric motor by the first wiper control device and the second electric motor by the second wiper control device based on blade position information regarding the driver's seat side wiper blade and the passenger's seat side wiper blade;

setting a heavy rain time wiping area to be narrower than a normal wiping operation area of the driver's seat side wiper blade within a forward field of view of the driver on the wiping surface;

when a heavy rain state is detected by rainfall being more than or equal to a predetermined amount as detected by the raindrop sensor, controlling a wiping range of the driver's seat side wiper blade to be within the heavy rain time wiping area, which is narrower than in a normal wiping operation; and activating a heavy rain mode in which the driver's seat side wiper blade is operated in a high speed activation state within only the heavy rain time wiping area.

2. The wiper system control method according to claim 1, wherein when the heavy rain mode is carried out and the driver's seat side wiper blade is operated in the high speed activation state within only the heavy rain time wiping area, the passenger's seat side wiper blade is activated over a same wiping area as the normal wiping operation and synchronized to the driver's seat side wiper blade.

3. The wiper system control method according to claim 2, wherein the heavy rain mode is selected by a user of the vehicle, and the heavy rain mode is executed by a switch setting operated by the user of the vehicle.

4. The wiper system control method according to claim 1, wherein the heavy rain mode is selected by a user of the vehicle, and the heavy rain mode is executed by a switch setting operated by the user of the vehicle.

5. A wiper system control device for performing an operation control on a wiper system for a vehicle including a wiper blade that performs a reciprocating wiping operation on a wiping surface, and a raindrop sensor that detects a current amount of rainfall based on water droplets adhering to the wiping surface, wherein the wiper blade includes a driver's seat side wiper blade arranged on a driver's seat side of the vehicle and a passenger's seat side wiper blade arranged on a passenger's seat side of the vehicle, the driver's seat side wiper blade being driven by a first electric motor and the passenger's seat side wiper blade being driven by a second electric motor separately provided from the first electric motor, the wiper system control device comprising:
 a first wiper control device configured to drive and control the first electric motor; and
 a second wiper control device configured to drive and control the second electric motor, the second wiper control device being connected to the first wiper control device by a communication line,
 wherein the first electric motor and the second electric motor are synchronously controlled such that the first electric motor is controlled by the first wiper control device and the second electric motor is controlled by the second wiper control device based on blade position information regarding the driver's seat side wiper blade and the passenger's seat side wiper blade,
 a heavy rain time wiping area narrower than a normal wiping operation area of the driver's seat side wiper blade is set within a forward field of view of the driver on the wiping surface, and the first wiper control device and the second wiper control device each include a non-transitory memory storing a program, which when executed operate as:
 a rainfall state determination unit that determines a current state of rainfall based on an output signal of the raindrop sensor; and
 an operation mode changing unit that, when the rainfall state determination unit determines that a heavy rain state is detected by an amount of rainfall being more than or equal to a predetermined value, changes an operation pattern of the wiper blade to a heavy rain mode in which a wiping range of the driver's seat side wiper blade is operated within the heavy rain time wiping area, which is narrower than in a normal wiping operation and the driver's seat side wiper blade is operated in a high speed activation state within only the heavy rain time wiping area.

6. The wiper system control device according to claim 5, wherein
 the second wiper control device activates the passenger's seat side wiper blade over a same wiping area as the normal wiping operation and synchronized to the driver's seat side wiper blade when the heavy rain mode is carried out and the driver's seat side wiper blade is operated by the first wiper control device in the high speed activation state within the heavy rain time wiping area.

7. The wiper system control device according to claim 5, wherein
 in the wiper system, the heavy rain mode is selected by a user of the vehicle, and the heavy rain mode is executed by a switch setting operated by the user of the vehicle.

8. The wiper system control device according to claim 6, wherein
 in the wiper system, the heavy rain mode is selected by a user of the vehicle, and the heavy rain mode is executed by a switch setting operated by the user of the vehicle.

\* \* \* \* \*